United States Patent [19]

Venable

[11] 3,886,076
[45] May 27, 1975

[54] PERLITE THERMAL INSULATION PRODUCT AND METHOD OF PRODUCING SAME

[75] Inventor: Joseph M. Venable, New Braunfels, Tex.

[73] Assignee: Pamrod, Inc., McQueeny, Tex.

[22] Filed: Dec. 22, 1972

[21] Appl. No.: 317,693

[52] U.S. Cl. .................. 252/62; 106/40; 106/86; 106/DIG. 2
[51] Int. Cl. .................................... C04b 43/02
[58] Field of Search ... 252/62; 106/40, 286, DIG. 2, 106/86

[56] References Cited
UNITED STATES PATENTS

| | | | |
|---|---|---|---|
| 2,971,878 | 2/1961 | Heilman et al. | 252/72 UX |
| 3,419,495 | 12/1968 | Weldes et al. | 252/62 |
| 3,682,667 | 8/1972 | Roberts et al. | 252/62 X |

FOREIGN PATENTS OR APPLICATIONS

| | | | |
|---|---|---|---|
| 835,823 | 3/1970 | Canada | 106/DIG. 2 |
| 1,172,550 | 11/1967 | United Kingdom | 106/DIG. 2 |
| 321,502 | 8/1969 | U.S.S.R. | 106/DIG. 2 |

*Primary Examiner*—Benjamin R. Padgett
*Assistant Examiner*—P. A. Nelson
*Attorney, Agent, or Firm*—Hubbard, Thurman, Turner & Tucker

[57] ABSTRACT

A compression molded, corrosion inhibiting thermal insulating product for use at temperatures up to about 1,800° F. is disclosed as comprising essentially a product formed by the mixture of about 35–52% water, about 20–32% expanded perlite, about 1.75–3.0% sodium tetraborate, about 2.5–3.0% sodium silicate, about 1.0–3.5% chopped inorganic fiber, about 0.33–2.0% silicone, and about 13.5–21.0% of a binder consisting of a metallic phosphate such as aluminum phosphate. A method of mixing constituents of the product and then compression molding the products into various shapes is also disclosed.

12 Claims, No Drawings

PERLITE THERMAL INSULATION PRODUCT AND METHOD OF PRODUCING SAME

This invention relates to a high temperature, compression molded, corrosion inhibiting thermal insulation product, and to methods for its preparation.

The use of expanded perlite, held together by an inorganic binder and a fiber network to form insulation materials is old in the art. Examples are such prior U.S. Pat. Nos. as Seybold 2,705,198; Cook 2,884,380; Heilman 2,971,878; Denning 3,042,578; Shannon 3,353,975; and McArthur 3,522,067. However, despite the large number of patents directed to this subject matter, none of these patents disclose a commercial insulation product that meets all of the following industrial requirements:

1. a product that is a true high temperature product (for example, for use from 1,200°F. to 1,800°F.), that is relatively inexpensive to produce, and is made from readily available materials;

2. such a product that has good cohesive strength at room temperature to permit shipping and handling of the product in different shapes;

3. such a product that is easily molded into different shapes, particularly suitable for pipe insulation, and has good dimensional stability so that it does not swell or shrink or otherwise change shapes while being stored (or formed) prior to installation;

4. such a product that has good thermal insulation properties up to its maximum temperatures, and has reasonably good green strength without the use of secondary binders.

5. such a product that has a relatively low bulk density, preferably from 8-15 pounds per cubic foot, but still has good cohesive strength;

6. such a product that has good water repellancy and is relatively non-wicking so that it may be stored in a damp environment prior to installation without taking up water;

7. such a product that includes a stress corrosion inhibitor to prevent corrosion of certain types of pipe to be insulated, particularly stainless steel;

8. such a product that, after curing, is non-leaching generally from the interior to its surface, so that the final product is stable and doesn't lose some of its essential properties; and 9. such a product that has good thermal shock characteristics and is effected by little or no spalling or chipping on the surfaces of the product when subjected to sudden temperature differentials.

The prior art patents do disclose thermal insulation products which provide some of these features. For example, in Shannon U.S. Pat. No. 3,523,085, and Mueller U.S. Pat. No. 3,639,276, Na, K and calcium are disclosed as being used in thermal insulation products for the purpose of inhibiting corrosions in certain metals. Other patents, such as Heilman U.S. Pat. No. 2,971,878, and Shannon U.S. Pat. No. 3,353,975, claim to provide products for use as low density, high temperature insulation up to and including 1,800°F., but the products made in accordance with the teachings of these patents do not meet the other requirements specified.

It is thus the primary object of this invention to provide a high temperature expanded perlite insulation product which can provide all of the advantages listed, and yet is relatively simple and inexpensive to manufacture.

In providing the insulation product of the present invention to fulfill the above stated object, the primary binder constituent employed is a metallic phosphate which includes a metallic ion in conjunction with an inorganic oxide, is characterized by a low pH, and is sensitive to pH change such as to precipitate when mixed with additional metallic or alkaline constituents. In preparing the insulation product of this invention, in order to accomplish the above stated object, it is necessary to add such an alkaline constituent to the product, and in doing so, under ordinary conditions, the binder will precipitate rapidly and many times before it actually performs its function as a binder. It is thus another object of this invention to provide a process for making the novel insulation product of this invention in a manner which avoids too rapid precipitation of the binder.

These and other objects of this invention, which will become apparent on consideration of this specification and appended claims, are accomplished by a critical balancing of water, silicone, metallic phosphates, expanded perlite, sodium tetraborate, sodium silicate, and an inorganic fiber, so that a superior, low density, insulating product can be formed which provides the desired overall properties noted from room temperature up to 1800°F.

In more detail, these critical ranges of elements are broadly defined in the starting material as about 35–52% water; about 0.33–2.0% silicones; about 13.5–21.0% Alkophos C, (a product of Monsanto, as more specifically disclosed in the Technical Bulletin 1-236 of that Company); about 2.5–3.0% sodium silicate; and chopped glass fibers — about 1 to 3.5 percent. After mixing and curing, as hereinafter described, these starting materials provide a dry, low density, thermal insulation product suitable for use up to 1,800°F., and which has the desirable characteristics noted. The broad ranges of constituents in the final dry product are about 40 to about 85 percent expanded perlite; about 10 to about 30 percent Alkophos; about 2.5 to about 10 percent sodium tetraborate; about 4.0 to about 10 percent sodium silicate; about 0.30 to about 4.0 percent silicone; and about 1.5 to about 12 percent chopped glass fibers, and the preferred ranges are from about 49 to about 78 percent expanded perlite; about 14 to about 22 percent Alkophos; about 4.7 to about 7.3 percent sodium tetraborate; about 6 to about 7.3 percent sodium silicate, about 0.48 to 2.5 percent silicone, and about 2.4 to 8.5 percent chopped glass fiber. A typical composition within the preferred range would include about 64% perlite, about 17% Alkophos; about 5.5% sodium tetraborate; about 6.8% sodium silicate; about 0.8% silicone; and about 5% glass fibers.

Broadly, the novel methods used to make these products are comprised of a wet and dry phase with the products of the two phases being combined after they are mixed individually. In the wet phase, a controlled and critical amount of water is placed in a container and liquid silicone is injected into the water and then the Alkophos is injected therein. Substantially, simultaneous with the preparation of the wet phase, the dry phase consisting of perlite, sodium tetraborate, sodium silicate, and an inorganic fiber such as chopped glass are mixed in another container. Once the dry and wet products have been separately mixed, and just before molding and firing of the product is to take place, the dry products are then sprayed with the wet products and then the combined wet and dry products are tumbled together in a mixing hopper. After sufficient mixing, the combined product formed is placed in a mold and compressed by a press into its desired shape. The molded product is then fired at about 480°F. to 580°F. for a time sufficient to dry the product in the system for a desired period of time and maintain the desired temperature all the way through at a temperature of at least 480°F. By use of the wet and dry phase method of preparation described, the Alkophos is not mixed with elements that would cause rapid precipitation until just prior to molding and firing so that it may function as a binder before any substantial precipitation occurs.

Additional features, objects, and advantages of this invention will become clear to those skilled in the art by careful study of the following detailed examples. In this specification and appended claims, all percentages and ratios are by weight, and, unless otherwise stated are based on the percentage of the total of all the materials added during the wet and dry phase to form the product of this invention.

The primary constituent of the insulation product of this invention is expanded perlite. Processes for expanding perlite to provide a low density filler are disclosed in U.S. Pat. Nos. 2,455,666; 2,501,699; 2,621,160; and are otherwise generally known in the art. The raw perlite used by the assignee of the present invention is obtained from Socorro, New Mexico and has the following nominal chemical analysis (percentages by weight):

| | | |
|---|---|---|
| $SiO_2$ | — | 74.1 |
| $Al_2O_3$ | — | 13.3 |
| $Fe_2O_3$ | — | 0.5 |
| $TiO_2$ | — | 0.05 |
| CaO | — | 0.6 |
| MgO | — | 0.1 |
| $Na_2O$ | — | 3.2 |
| $K_2O$ | — | 4.6 |
| $SO_3$ | — | 0.1 |

This information is obtained from the Bureau of Mines Report of Investigation No. 5199, entitled "Composition of Perlite" and additional characteristics of perlite are set forth in that publication and will not be repeated herein. Most, if not all, of the perlites that are processed in this country are chemically similar and would be suitable for use in the product of this invention.

When expanded, the perlite used with the composition of this invention has a density of about 2 to 5 pounds per cubic foot, and preferably from 2 to 3 pounds per cubic foot. Expansion of the perlite generally takes place at temperatures of from about 1,500°F. to 2,200°F., depending on the water content of the perlite used. The expanded perlite will generally vary in particle size, with a typical average particle size being between about 250 microns to about 850 microns, with particle sizes being scattered through a size above and below these members.

The chief binder constituent for the expanded perlite is a metal phosphate such as an aluminum phosphate compound sold under the trade name Alkophos C or Alkophos CE, as previously noted, and having a composition represented generally by the formula $Al_2O_3 \cdot 3P_2O_5 \cdot XH_2O$. The Alkophos used has a 43% solids content and is characterized by a low pH of about 2.6. Formation of precipitation in Alkophos CE is normally slow and occurs over a period of about three weeks if no foreign basic constituents are added, and is even slower in Alkophos C. However, when mixed with an alkaline which raises its pH above about 3.2, such as necessarily occurs in the present invention in order to provide the desired insulation product, precipitation occurs relatively rapid, thus rendering the period of time during which the Alkophos is usable as a binder to a relatively short period. Also, Alkophos is exothermic up to about 480°F. and becomes endothermic above this temperature, and in a range of temperatures from 480°F. to 580°F. When heated in that range and preferably to above 500°F., the insulation product formed with Alkophos is essentially water insoluable, but if heated to lesser temperatures during curing, the product formed will adsorb water and tend to be tacky.

If desired, various inert fillers can be added to the products of this invention in relatively small amounts, and can comprise particulate material, such as the clays gypsum, wollastonite, fly ash, vermiculite, mica, and/or fibrous fillers, such as the chopped glass fiber noted, nylon, polypropylene, rayon, cellulosic materials, metal whiskers or mesh, alumino-silicate fibers, rock-wool, slagwool, and the like. Of course it is preferred that only inorganic fillers be added if the product is to be used at the higher temperature. Also, coloring, such as provided by carbon black, as noted in the following examples of this invention, may be added as desired.

Details of the other constituents of the present invention and their additions in various amounts, including a preferred amount according to this invention, and other critical features of this invention, are set out in the following examples:

EXAMPLE I

In preparing the material of this example, which illustrates the preferred composition of this invention, including the preferred process of making it, two mixing chambers were provided, one for a wet phase and one for a dry phase. In the wet phase, 138.75 pounds of water, containing a maximum grain hardness of 5 grains, was introduced into the wet phase mixing chamber. The grain content of the water has been found to be critical as metal ions which are dissolved in water can cause the Alkophos to precipitate if the grain hardness is excessive. Reducing of this hardness, as used in this example, was done in a water softening system, using a phosphate. As the quantity of water is critical to the production of a homogenous product, this aspect of the addition must be controlled. The problems created if excess water is present will be layering when there is compression at the molding stage later on in this process, whereas too little water will cause poor binding and low cohesive strength. 1.5 pounds of silicone was then added to the water in the form of Union Carbide R-64 silicone, having a 60 percent solids content. Silicone should be added to the water before adding Alkophos in order to keep the materials that would cause precipitation as dilute as possible. About 47.5 pounds of Alkophos C (43 percent solids content) was added to the wet phase mix, and a small amount (1.50 pounds) of Aqua Black (Carbon Black), having a 50 percent solids content, was added for coloring only to give the final product a distinctive gray color and to mask smudges on the product from handling. The constituents of the wet phase were thoroughly mixed to form a homogenous mixture in 4 to 10 minutes. The wet phase mixture was then ready for mixing with the dry phase constituents. The dry phase was prepared by adding 76 pounds of expanded perlite (from Socorro, New Mexico) to a rotating tumbler type mixing drum which included a counter rotating whip. As the mixing drum rotated with the expanded perlite in it, 6.5 pounds of dry sodium tetraborate and 8.0 pounds of dry sodium silicate (Diamond Shamrock, SS-65) were then added to the dry mix. Then, 5.76 pounds of chopped glass fiber (Owens Corning chopped Glass Rovings, 707) were added and the dry mixture was tumbled and agitated for a time sufficient to provide thorough mixing, but no long enough as to break up the perlite particles before they were mixed with the liquid mixture. A suitable time for this tumbling and mixing may be in the order of 3 to 7 minutes. The liquid mixture was then sprayed into the dry phase mixing drum to wet the dry mixture and form a damp product having the consistency of damp sand. The product formed was then dropped to the bottom of the drum and carried out of the drum, from the drum into a receiving hopper and carried out of the hopper by conveyor. The product formed was collected and weighed to get the correct amount of damp product which when compressed to a specified volume, and subsequently dried, would provide a final product having a desired low density of about 10.5 pounds per cubic foot. The molded product was then placed in a drying oven and dried at 500°F. for about 12 to 48 hours until the product dried thoroughly and uniformly throughout its thickness. It should be understood that the time required to cure the product will vary with the thickness of the product, the atmospheric conditions, and the density of the product. The important thing is that the drying procedure be such that the 500°F. temperature is reached throughout the product so that the endothermic reaction of the Alkophos takes place. The dry, molded product then had a composition of about 64% expanded perlite; 17% Alkophos; 5.5% sodium tetraborate; 6.8% sodium silicate; 5% chopped glass, and the balance about equally of silicone and aqua black, and was characterized by superior properties when compared with product made from compositions at either end of the claimed ranges for this product, as shown by the following test results.

ASTM Drop Test C-487-64

A = high end limit of chemicals and their results.
B = low end limit of chemicals and their results.
C = preferred range chemical composition and result.

| $H_2O$ | Density | Inches Dropped to Produce Failure |
|---|---|---|
| A 52% | 10 No. | 14" |
| B 35% | 10 No. | 9" |
| C 42% | 10 No. | 20.5" |
| Chopped Glass | | |
| A 35% | 10 No. | 30" |
| B 1.0% | 10 No. | 28" |
| C 2.8% | 10 No. | 33" |
| $Na_2B_4O_7$ | | |
| A 3.0% | 10 No. | 22" |
| B 1.75% | 10 No. | 28" |
| C 2.5% | 10 No. | 31" |
| Silicone | | |
| A 2% | 10 No. | 17" |
| B .33% | 10 No. | 15" |
| C 1.25% | 10 No. | 23" |
| Perlite | | |
| A 32% | 10 No. | 11" |
| B 20.50% | 10 No. | 33" |
| C 26% | 10 No. | 22.5" |
| Alkophos | | |

-Continued

| $H_2O$ | Density | Inches Dropped to Produce Failure |
|---|---|---|
| A 21% | 10 No. | 31" |
| B 13.5% | 10 No. | 12" |
| C 17.5% | 10 No. | 33" |

The product formed resisted spalling and thermal shock as illustrated by a test in which the product was heated to from 1,500°F. to 1,800°F., and then dipped in water at room temperature. In known prior art products, spalling or hairline cracks and chips appear in the presence of such conditions. The product of Example I. also inhibits corrosion in stainless steel pipe, as can be shown by the Dana Stress Corrosion Cracking of Insulated Austenitic Stainless Steel. ASTM Bulletin, Oct. 1957, ASTM STP No. 264. It was also non-leaching as illustrated by observing the product for a period of 10 days in a controlled environment having a relative humidity of 50 percent. No whiskers or crystaline growth characteristic of leaching occured on the surface of the product during the ten day test period.

The product of the Example also has low thermal conductivity (k factor) of about 0.57° at 600°F. mean temperature and can function as an insulation product even at about 1,800°F. without decomposition.

A satisfactory thermal insulation product can be made using the process steps as set out in Example I., but leaving out some of the chemical elements; however, it is generally an inferior product in some respect to that of Example I., though it might not be unusable for certain applications. For example:

EXAMPLE II 138.75 pounds of water, 5 grain or less, hardness was added to the liquid mixing tank, which was then followed by 1.50 pounds of silicone R-64 in 60 percent solution, then 47.50 pounds of Alkophos C. having a 43 percent solid content liquid was added. The dry phase was prepared by adding 76 pounds of expanded perlite, 7.5 pounds of $Na_2SiO_3$, and 5.75 pounds of chopped glass. The liquid phase and dry phase were then mixed as described above and the products were formed, dried, and cured as also above described. The resulting product though, while superior to the prior art products in many respects, is inferior to Example I product in that it will spall when the spalling tests, as above described, are performed. This product then might be used in an application where spalling and thermal shock are not significant design criteria, for example in environments where sudden changes in temperature are not encountered by the insulation product.

Also, a product superior to the prior art can be produced by using the following composition as set out in Example III:

EXAMPLE III

Wet Phase:

138.75 lbs. $H_2O$ (maximum 5 grain hardness)
1.50 lbs. silicone R-64 (a suspended 60 percent solution)
47.50 lbs. alkophose (a 43 percent solid suspended liquid)

Dry Phase:

76.00 lbs. expanded perlite
5.75 lbs. chopped glass

These are mixed, formed dried, and cured as described above. While the product of Example III. is superior to prior art product, it now has no corrosion inhibition characteristics and is subject to spalling and chipping. If these characteristics are not important design criteria, then an acceptable product can be made at substantially reduced costs.

It should be understood that in the making of this thermal insulation product of this invention, deviations of the relative percentages of the constituents of this invention, outside the following broad ranges of about 35 to 52% $H_2O$; about 13.5 to 21% alkophos C (43%); about 20.5 to 32% perlite; about 1.75 to 3.00% $Na_2B_4O_7$; about 2.50 to 3.00% $Na_2SiO_3$; and about 1.00 to 3.5% chopped glass, will form a product which will not have the various features of the insulating product of this invention, as previously noted.

If, for example, water exceeds 52% in the starting materials, then the molded product becomes very difficult to handle in going from the press to the oven. The mold release from the press is poor and the substantially zero compression factor of $H_2O$ creates internal bi-lithic patterns which cause separation and cracking when cured.

Should water not be added up to 35% of the starting materials, then the molded product again becomes very difficult to handle, due to low green strength and it crumbles to the touch. Even the cured product is too soft and fragile for shipping and could not be shipped or handled in field use.

If the percentage of Alkophos in the starting materials of the insulation product of this invention is raised above 21%, the density of the material becomes too great with a corresponding increase in K factor and cost, and a generally poor insulation product is formed. Also the product becomes brittle and inflexible.

However, if the percentage of Alkophos in the starting materials of the insulation product of this invention is below 13.5 percent, then the binder to inert volume ratio is so low that there are too many exposed inert surfaces without binder, thus the product has unbound areas causing very low quality in all desirable properties, such as structural integrity, green strength, etc. It is also generally crumbly.

If the percentage of perlite in the starting materials of the insulation product of this invention is above 32 percent, the green strength of the final product is low and it will be too soft before and after curing. After curing, the product is too soft, dimensionally unstable, displays areas of unbound systems, and in general is not an acceptable insulation product.

If the percentage of perlite in the starting material of the insulation product of this invention is below 20.5%, the same problems noted with respect to the limits of water are present. Release from the mold becomes very difficult, green strength drops off and handlibility becomes poor. The product has poor dimensional stability and cracks on curing. Also, the bulk density of the product increases and its thermal conductivity properties decrease.

The additions of sodium tetraborate and sodium silicate to the starting materials of the insulation product of this invention must not exceed a combined addition of 6 percent of addition products, lest they produce rapid precipitation of the Alkophos binder. This is particularly a factor where there is some time lag between mixing the wet and dry phases, molding, and final curing, such as may be the case where curing oven capacity is limited. If a sufficient amount of Alkophos is precipitated, the effective percentage of Alkophos available as binder would be reduced with the results occurring mentioned in the above description of below minimum Alkophos addition. If a product is formed with excess amounts of sodium tetraborate and/or sodium silicate, the dry materials may not be sufficiently wetted without exceeding the maximum limit of water, and the dry sodium tetraborate and sodium silicate may not become surrounded by the Alkophos which may cause a leaching effect on the surface of the cured product. Cost factors also dictate using as little of these constituents as possible.

Should an amount of less than 1.75 percent sodium tetraborate be added to the starting material of the product, it is subject to thermal shock and spalling when heated above 1,500°F. and then plunged into water. If sodium silicate and sodium tetraborate are used in a combined amount of less than 1.75 percent or sodium silicate alone in an amount of less than 1.75 percent in the starting material of the insulating product of this invention, the results are a product with insufficient inhibition to stress corrosion when used on stainless steel.

If chopped glass is added in the starting material below the minimum level of 1 percent there is no reinforcing effect produced, however, even if more than 1 percent is added and it is not distributed to 1 percent homogeniously then weak spots in the material occur.

In addition to the above, the maximum of 3.50 percent of chopped glass addition to the starting material, presents a cost problem as well as an adsorption problem, causing insufficient wetting of all inerts, which produces a crumbly and flakey product.

The silicone is added primarily to increase water repellancy of the insulating material, however, if added above 2% to the starting material of the insulation product of this invention, it will reduce the "pot-life" of the mix because it drives the Alkophos beyond its critical pH precipitation point. Also, the finished hardness of the final product is reduced and cost is increased. The minimum level of 0.33 percent addition of silicone to the starting material is the point beyond which no water repellancy benefit is gained by the insulation product provided, by this invention.

In the stated examples, the primary binder constituent is disclosed as a metallic phosphate such as Alkophos C or CE. This constituent must function to bind the perlite particles together from room temperature to the maximum temperature of the product, i.e. 1,800°F. without decomposition, and should be water insoluable. Also, the availability of the product and its cost is an important factor. Other acidic phosphates, such as zirconium phosphate, vanadium phosphate, and calcium phosphate may also function as a binder in this invention, however, use of such materials is less preferred.

Sodium tetraborate functions in the critical amounts noted, both as a corrosive inhibitor (in combination with sodium silicate) and to lessen or prevent spalling and thermal shock when the product of this invention is suddenly subjected to extreme temperature changes.

It is believed that the tetraborate in the sodium tetraborate is primarily responsible for the latter. Spalling is defined herein as surface crackings and chipping which occur under the extreme conditions noted and thermal shock is any detrimental change in the structure of the product responsive to sudden exposure to large temperature differentials.

Sodium silicate (alone or in conjunction with the sodium tetraborate) also is added as a stress corrosion inhibitor, particularly when the pipe to be insulated is austenitic stainless steel. This is believed to occur because chlorides and possibly bromides and fluorides collect on the pipe when exposed to moisture and the sodium ions of the sodium silicate combine with the chloride ion to provide a harmless salt. Other metaloid materials with a positive ionic valence, such as potassium, phosphorous, and calcium would also function to inhibit stress corrosion.

From the foregoing, it will be seen that this invention is one well adapted to attain all of the ends and objects hereinabove set forth, together with other advantages which are obvious and which are inherent to the perlite insulation product and method for producing same.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

The invention having been described, what is claimed is:

1. A method of forming a low density corrosion inhibiting thermal insulation product comprising the steps of:
   a. Mixing a wet phase liquid product in a wet phase mixing zone by:
      i) Adding about 35–52 percent water;
      ii) Adding about 0.33–2.00 percent liquid silicone water repellency material to the water;
      iii. Adding about 13.5–21.0 percent of metallic phosphate binder to the product of steps i) and ii);
   b. Mixing and agitating in a dry phase mixing zone, about 20.5 to 32 percent expanded perlite having a bulk density from about 2–5 pounds per cubic foot; not more than 6 percent of at least one of sodium tetraborate and sodium silicate; and about 1.0–3.5 percent of an inorganic fiber;
   c. Wetting substantially uniformly the product of step b) with the product of step a);
   d. Placing the wetted product of step c) in a compression zone to form a desired article; and
   e. Curing the molded product in a heating zone at a temperature of at least 500°F. for a period of time sufficient to heat the molded product throughout to a temperature of at least 480°F.

2. The method of claim 1 wherein step b) about 1.75–3.0 percent sodium tetraborate is added in the dry phase mixture.

3. The method of claim 1 wherein step b) about 2.5–3.0 percent sodium silicate is added in the dry phase mixture.

4. The method of claim 3 wherein step b) about 2.5–3.0 percent sodium silicate is added in the dry phase mixture.

5. The method of claim 1 wherein said metallic phosphate binder is an aluminum phosphate binder.

6. The method of claim 5 wherein said aluminum phosphate is represented by the formula $Al_2O_3 \cdot 3P_2O_5 \cdot xH_2O$.

7. The method of claim 5 where about 47% water; about 0.50% silicone; about 16% aluminum phosphate binder; and about 0.50% carbon black are added in step a), and about 26% perlite; about 5.5% sodium tetraborate; about 2.5% sodium silicate; and about 2.00% chopped glass fibers are added in step b).

8. The method of claim 1 wherein the maximum grain hardness of the water is maintained below 5 grains of hardness.

9. A stress corrosion inhibiting, low density thermal insulation product consisting essentially of about 45–80% expanded perlite having a bulk density of from about 2–5 pounds per cubic feet; about 10–40% of a metallic phosphate binder; about 2.5–12.0% sodium tetraborate; about .30–4.0% silicone water repellency material; and about 1–13% of a chopped glass fiber, said product being capable of withstanding temperatures up to 1,800°F. without decomposition, having a bulk density of from 5–20 pounds per cubic foot and having relatively low thermal conductivity.

10. The product of claim 9 wherein said metallic phosphate binder is aluminum phosphate, represented generally by the formula $Al_2O_3 \cdot 3P_2O_5 \cdot xH_2O$.

11. The product of claim 9 wherein the bulk density of the final product is from about 8–15 pounds per cubic foot.

12. The product of claim 10 consisting essentially of about 60% perlite; about 16% aluminum phosphate binder; about 13% sodium tetraborate; about 6% sodium silicate; about 5% chopped glass; and the remainder being silicone.

* * * * *